R. E. DE CAMP.
MOTOR CONTROL SYSTEM.
APPLICATION FILED OCT. 6, 1916. RENEWED MAR. 30, 1920.
1,354,173.
Patented Sept. 28, 1920.
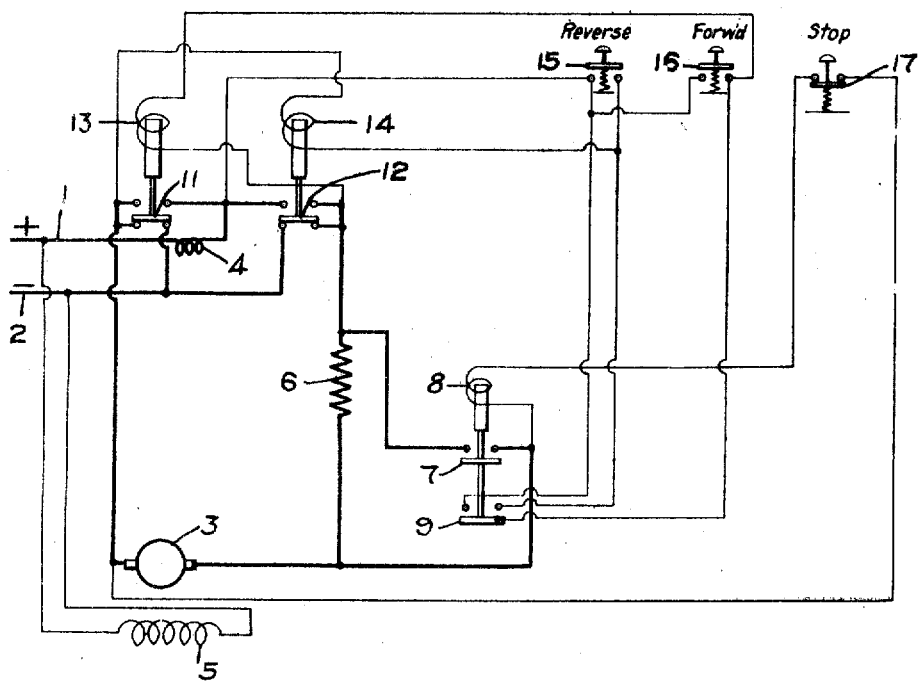
WITNESSES:
INVENTOR
Ray E. De Camp.
BY
ATTORNEY

UNITED STATES PATENT OFFICE.

RAY E. DE CAMP, OF WILKINSBURG, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,354,173.     Specification of Letters Patent.     Patented Sept. 28, 1920.

Application filed October 6, 1916, Serial No. 124,043. Renewed March 30, 1920. Serial No. 370,049.

*To all whom it may concern:*

Be it known that I, RAY E. DE CAMP, a citizen of the United States, and a resident of Wilkinsburg, in the county of Allegheny and State of Pennsylvania, have invented a new and useful Improvement in Motor-Control Systems, of which the following is a specification.

My invention relates to motor-control systems, and particularly to such systems as are employed in connection with electric motors for driving planers or similar machines requiring frequent stops and reversals.

My invention has for its object to provide a system of the above-indicated character which embodies means for preventing the closing of the motor circuit for operation in different directions simultaneously and for insuring the opening of the controlling switches in a predetermined order.

In the operation of electric motors which are brought to rest by dynamic braking by means of a local circuit comprising the motor armature and the starting resistor, it is essential that the resistor be inserted in circuit with the motor armature before the main circuit of the motor is opened.

I provide an arrangement whereby the reversing switches of an electric motor are electrically interlocked in order to prevent their simultaneous closing. The starting resistor is controlled by an accelerating switch. A relay that is operatively connected to the accelerating switch maintains the closure of one of the reversing switches until the accelerating switch has opened to insert the resistor in circuit with the motor armature in readiness for the completion of the dynamic braking circuit upon the opening of the reversing switch.

In the accompanying drawing, the single figure is a diagrammatic view of circuits and apparatus embodying my invention.

Line conductors 1 and 2, which may be connected to any suitable source of direct current, supply energy to an electric motor having an armature winding 3, a series field-magnet winding 4 and a shunt field-magnet winding 5. A starting resistor 6 is controlled by an accelerating switch 7 having an actuating coil 8. A relay 9 is mechanically connected to the switch 7 to open and close when the switch 7 occupies its corresponding position.

The main circuits of the motor are controlled by double-throw reversing switches 11 and 12 that are respectively provided with actuating coils 13 and 14. The circuits of the actuating coils of the several switches are controlled by push button switches 15, 16 and 17 which operate to produce effects upon the operation of the motor corresponding to the legends placed adjacent to the respective switches.

To start the motor in the forward direction, the push button switch 16 is actuated to complete a circuit which extends from the positive line conductor 1 through switch 16, actuating coil 13 and back contact members of switch 12 to line conductor 2. The coil 13 is energized to close switch 11 and thus complete the armature circuit of the motor which extends from line conductor 1 through series field-magnet winding 4, switch 11, armature 3, starting resistor 6, and back contact members of switch 12 to line conductor 2.

The motor then operates in the forward direction. When the speed of the motor reaches a rate at which its counter-electromotive force has a predetermined value, the coil 8, which is connected across the terminals of the motor armature, is energized to close switch 7 and thereby complete a shunt circuit for the resistor 6. The push-button switch 16 should be held in its closed position until the switch 7 closes to effect the closing of relay 9. The latter, upon closing, completes a shunt circuit for the push-button switches 15 and 16 and closes a holding circuit for the actuating coil 13.

To stop the motor, the push button switch 17 is actuated to open the circuit of the actuating coil 8 and thereby cause the switch 7 to open the shunt circuit for the resistor 6. The opening of relay 9, which occurs simultaneously with the opening of switch 7, opens the holding circuit of actuating coil 13. The switch 11 then opens to complete a dynamic braking circuit for the motor which extends from one terminal of the motor armature through the back contact members of switches 11 and 12, resistor 6, and field-magnet winding 4 to the other terminal of the motor armature. The motor is then brought quickly and safely to rest.

To start the motor in the reverse direction, the push button switch 15 is closed to complete the circuit of the actuating coil 14 of the switch 12. This circuit extends from line conductor 1, through switch 15, coil 14 and back contact members of switch 11, to line conductor 2. The switch 7 closes in the manner previously described in connection with the forward rotation of the motor. The relay 9 again closes a shunt circuit for each of the switches 15 and 16. The latter switch may then be released, the relay 9 maintaining a holding circuit for the coil 14. The motor is stopped in the manner described above.

It will be noted that, when switch 11 is in its closed position, it is impossible to effect the closing of switch 12 because the switch 11, upon closing, opens the circuit, traced above, of the coil 14 at the back contact members of the switch 11. Independently of this circumstance, it is not possible to effect the closing of the switch 12 when the switch 11 occupies its closed position because the switch 11, upon closing, establishes a shunt circuit for the actuating coil 14 which extends from the switch 11, through the actuating coil 14 and the relay 9, to the other terminal of the switch 11. A similar double effect is obtained for the circuit of the coil 13 upon the closing of the switch 12. It will be impossible, therefore, to effect the closing of either of the reversing switches when the other occupies its closed position. As above stated, the relay 9 establishes a shunt circuit for each of the push-button switches 15 and 16.

A single set of contacts, controlled by the accelerating switch, operates to establish shunt circuits for the controlling push-button switches when the motor is in operation, so that the actuating coil of the reversing switch operated will remain excited, and that reversing switch constituting a shunt for the actuating coil of the other reversing switch.

I claim as my invention:

1. In a motor-control system, the combination with an electric motor, a pair of reversing switches and an accelerating switch, of means for effecting the closing of each of said reversing switches, said means comprising a controlling switch and said other reversing switch when said other reversing switch occupies an inoperative position, and means controlled by said accelerating switch and operative in conjunction with said other reversing switch, when said other reversing switch remains in said inoperative position, to maintain said first reversing switch closed until said accelerating switch is opened.

2. In a motor-control system, the combination with an electric motor, a pair of reversing switches and an accelerating switch, of means for effecting the closing of each of said reversing switches, said means comprising a controlling switch and said other reversing switch when said other reversing switch occupies an inoperative position, and a relay mechanically connected to said accelerating switch for permitting said controlling switch to become inoperative when said accelerating switch is closed, said relay and said other reversing switch then maintaining said first reversing switch closed.

3. In a control system, the combination with a pair of switches each adapted to occupy a normal position, and an actuating coil for each of said switches adapted to cause the actuation of its corresponding switch to a second position, of a second pair of switches each adapted to cause the energization of one of said coils to effect said actuation of said corresponding switch, the circuit of the actuating coil of each of said first pair of switches including said controlling switch for said coil and the other of said first pair of switches when said other switch occupies said normal position, and means for short-circuiting said controlling switch from said circuit but maintaining said other of said first pair of switches in said circuit.

4. In a motor-control system, the combination with an electric motor, a pair of reversing switches therefor each adapted to occupy an operative position and an inoperative position, and an actuating coil for each of said switches, of a second pair of switches each adapted to control the energization of one of said coils, the circuit of the actuating coil of each of said reversing switches including said controlling switch for said coil and the other of said reversing switches when said other switch occupies said inoperative position, and means for short-circuiting said controlling switch but maintaining said other of said reversing switches in said circuit.

5. The combination with an electric motor, of a pair of reversing switches therefor each adapted to occupy an operative position and an inoperative position and each having an actuating coil in circuit with the other reversing switch when said other reversing switch occupies its inoperative position, a second pair of switches each adapted to close the circuit of one of said coils, an accelerating switch, and a relay for maintaining the circuits of said coils closed that is mechanically connected to said accelerating switch and is electrically connected in series with each of said switches when said switches occupy their inoperative positions and the coil of the other of said switches and in parallel to said controlling switches.

In testimony whereof, I have hereunto subscribed my name this 28th day of Sept., 1916.

RAY E. DE CAMP.